(12) United States Patent
Huang et al.

(10) Patent No.: US 8,439,320 B2
(45) Date of Patent: May 14, 2013

(54) EXTRACTING APPARATUS FOR STORAGE MODULE

(75) Inventors: Ri-Dong Huang, Shenzhen (CN);
Yang-Ming Lin, Shenzhen (CN);
Hsuan-Tsung Chen, Taipei Hsien (TW);
Guang-Yao Lee, Taipei Hsien (TW)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 241 days.

(21) Appl. No.: 12/875,087

(22) Filed: Sep. 2, 2010

(65) Prior Publication Data

US 2011/0114808 A1    May 19, 2011

(30) Foreign Application Priority Data

Nov. 16, 2009    (CN) .......................... 2009 1 0309776

(51) Int. Cl.
*A47B 96/00*    (2006.01)
(52) U.S. Cl.
USPC .............. 248/221.11; 248/220.22; 312/332.1; 361/679.39
(58) Field of Classification Search ................ 312/332.1, 312/223.2, 330.1; 361/679.02, 679.33, 679.39, 361/685; 248/220.21, 220.22, 221.11, 222.11, 248/222.12, 27.1, 27.3

See application file for complete search history.

(56) References Cited

U.S. PATENT DOCUMENTS

| 4,947,661 | A  | * | 8/1990  | Yoshida ........................... 70/57 |
| 5,152,496 | A  | * | 10/1992 | Kobayashi ................... 248/551 |
| 5,588,728 | A  | * | 12/1996 | Eldridge et al. ........... 312/332.1 |
| 6,616,106 | B1 | * | 9/2003  | Dean et al. .................. 248/27.1 |
| 2003/0011977 | A1 | * | 1/2003 | Song et al. .................... 361/684 |
| 2010/0172086 | A1 | * | 7/2010 | Chen et al. ............... 361/679.33 |
| 2012/0087084 | A1 | * | 4/2012 | Nguyen et al. .......... 361/679.37 |

* cited by examiner

*Primary Examiner* — Alfred J Wujciak
(74) *Attorney, Agent, or Firm* — Altis Law Group, Inc.

(57) ABSTRACT

The extracting apparatus includes a bracket, a holder extractably mounted to the bracket, a locking member, an elastic member connecting the bracket with the locking member, and a handle pivotably connecting to the bracket. The locking member is pivotably engaged with the bracket. The handle includes a cam, and the locking member includes a latch portion. When the extracting apparatus is at a locked position, the latch portion of the locking member extends through the bracket to securely engage with the holder. When the handle is pivoted to move toward the bracket, the cam of the handle drives the locking member to rotate relative to the bracket for releasing the holder.

17 Claims, 7 Drawing Sheets

EXTRACTING APPARATUS FOR STORAGE MODULE

BACKGROUND

1. Technical Field

The present invention relates to extracting apparatuses and, more particularly, to an extracting apparatus for a data storage module.

2. Description of Related Art

An electronic apparatus, such as a desktop computer, tower computer, server, or the like, usually includes storage modules, such as hard disk drives, compact disk read-only memory (CD-ROM) drives, digital video disc (DVD) drives, floppy disk drives, and the like. These devices are typically added to increase the functionality of the electronic apparatus as desired by a user.

The installation of a hard disk drive in a computer typically involves the use of screws to attach the hard disk drive to a bracket. Therefore, a storage module including the hard disk drive and the bracket is formed, which is extractably mounted in a computer chassis. However, installed the storage module may fit too tightly in the computer chassis to be drawn out easily.

DETAILED DESCRIPTION

Figure 1:
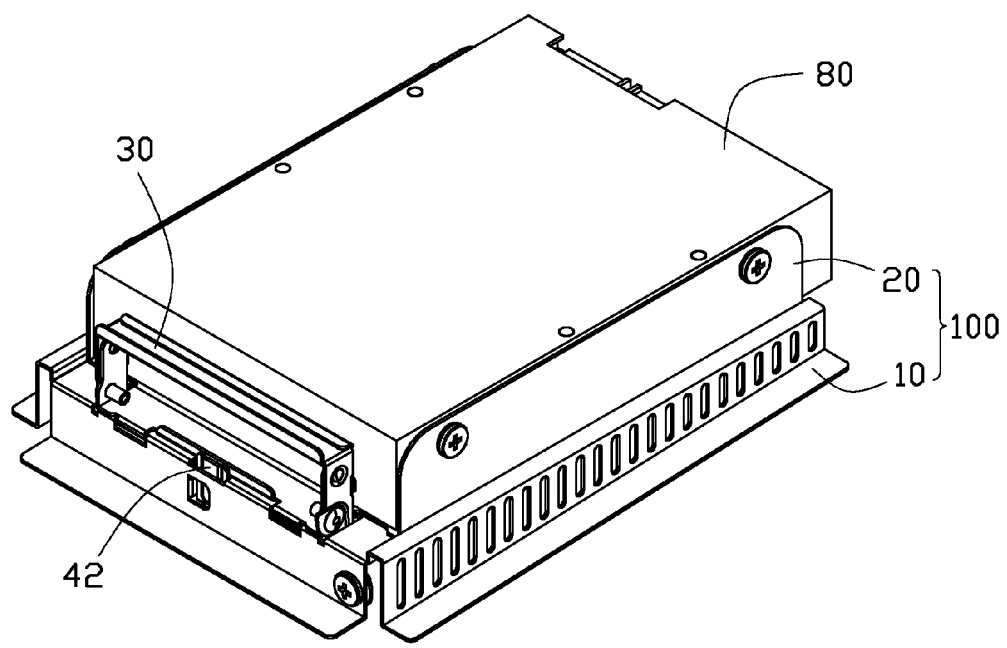
FIG. 1 is an isometric view of an exemplary embodiment of an extracting apparatus and a storage module, the extracting apparatus including a bracket.
Figure 2:
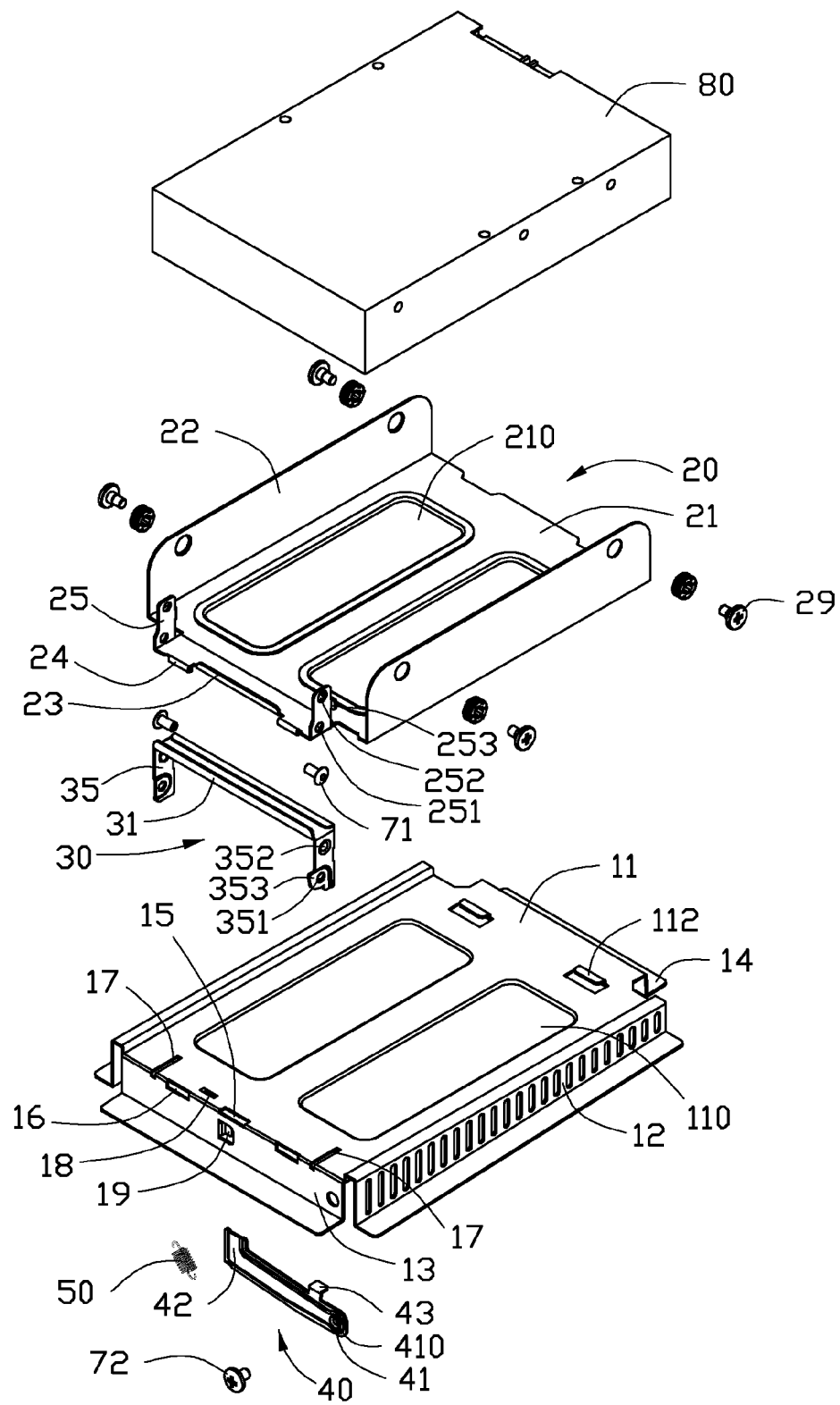
FIG. 2 is a disassembled view of FIG. 1.
Figure 3:
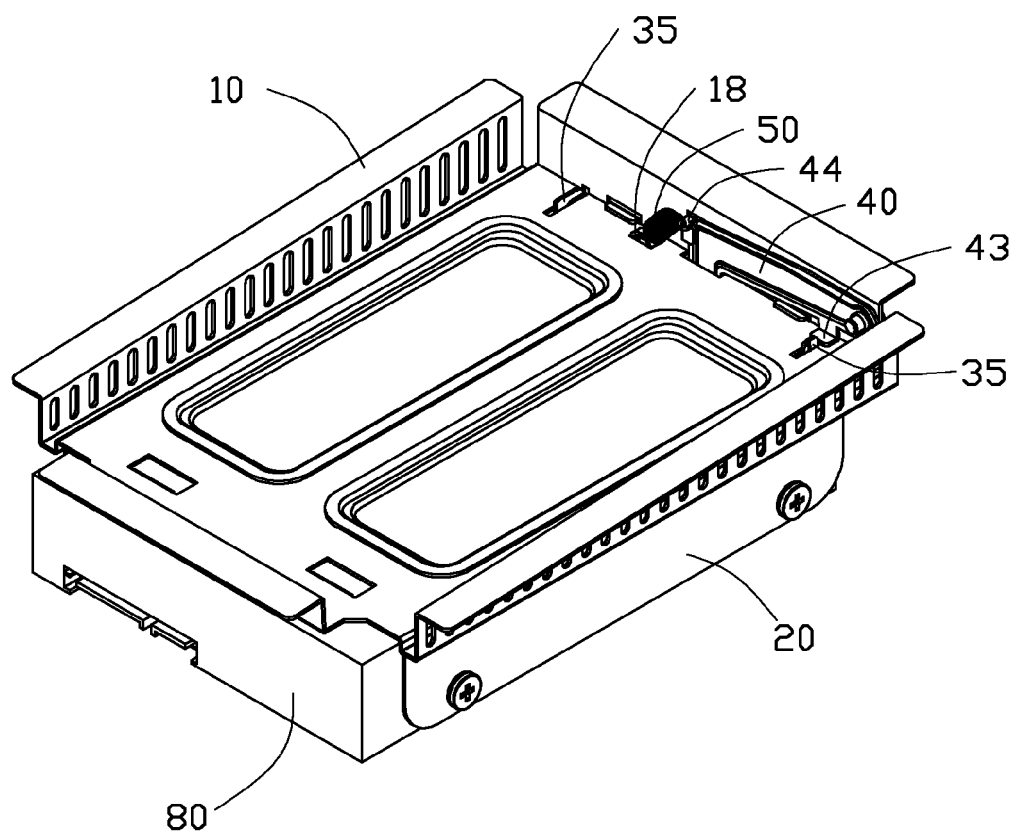
FIG. 3 is an inverted view of FIG. 1.

Referring to FIGS. 1 to 3, an exemplary embodiment of an extracting apparatus 100 includes a bracket 10, and a holder 20 extractably mounted in the bracket 10. The bracket 10 can be mounted in an electrical device (not shown), such as a server or a computer. The holder 20 is used to receive a storage module 80 therein, thereby facilitating extractably mounting the storage module 80 together with the holder 20 into the electrical device. In the present embodiment, the extracting apparatus further includes a handle 30 pivotably engaged with the holder 20, a locking member 40 pivotably engaged with the bracket 10, and an elastic member 50 connecting the bracket 10 to the locking member 40.

The holder 20 includes a bottom wall 21, and two sidewalls 22 respectively extending upwards from opposite sides of the bottom wall 21. The storage module 80 is supported by the bottom wall 21, and fixed in the holder 20 with a number of screws 29 extending through the sidewalls 22 and engaging in the storage module 80. Two substantially rectangular first openings 210 are defined in the bottom wall 21, each adjacent to one of the sidewalls 22. Two opposite handle mounts 25 extend upwards from a front end of the bottom wall 21. Each handle mount 25 defines a first pivot hole 251, and a snapping hole 252 over the first pivot hole 251. A tab 253 extends from a rear side of each handle mount 25 away from the opposite handle mount 25. Two insertion pieces 24 extend downward from the front end of the bottom wall 21 between the handle mounts 25, and are bent backwards to be used for clipping the bracket 10 in place. A blocking portion 23 extends upwards from the front end of the bottom wall 21 between the insertion pieces 24.

The handle 30 includes an elongated operating portion 31, and two arms 35 extending downward from opposite ends of the operating portion 31 along a same direction. Each of the arms 35 defines a second pivot hole 351 in a lower end thereof. An inner surface of each arm 35 adjacent to the operating portion 31 forms a protruding point 352 towards the other arm 35. Two pins 71 are employed to extend the second pivot holes 351 of the handle 30 and the first pivot holes 251 of the holder 20, for pivotably engaging the handle 30 with the holder 20. When the arms 35 of the handle are rotated to be perpendicular with the bottom wall 21 of the holder 20 as shown in FIG. 2, the arms 35 are positioned by the tabs 253 of the corresponding handle mounts 25 of the holder 20, and the protruding points 352 of the arms 35 are snapped in the snapping holes 252 of the corresponding handle mounts 25, so as to keep the handle 30 at the present position relative to the holder 20. A cam 353 extends from one of the arms of the handle 30. A length of the cam 353, which is perpendicular to the corresponding arm 35, is greater than a width of the cam 353, which is parallel to the corresponding arm 35. When the handle 30 is rotated, the cam 353 is able to extend through the bracket 10 to engage with the locking member 40, to urge the locking member 40 to rotate.

Figure 4:
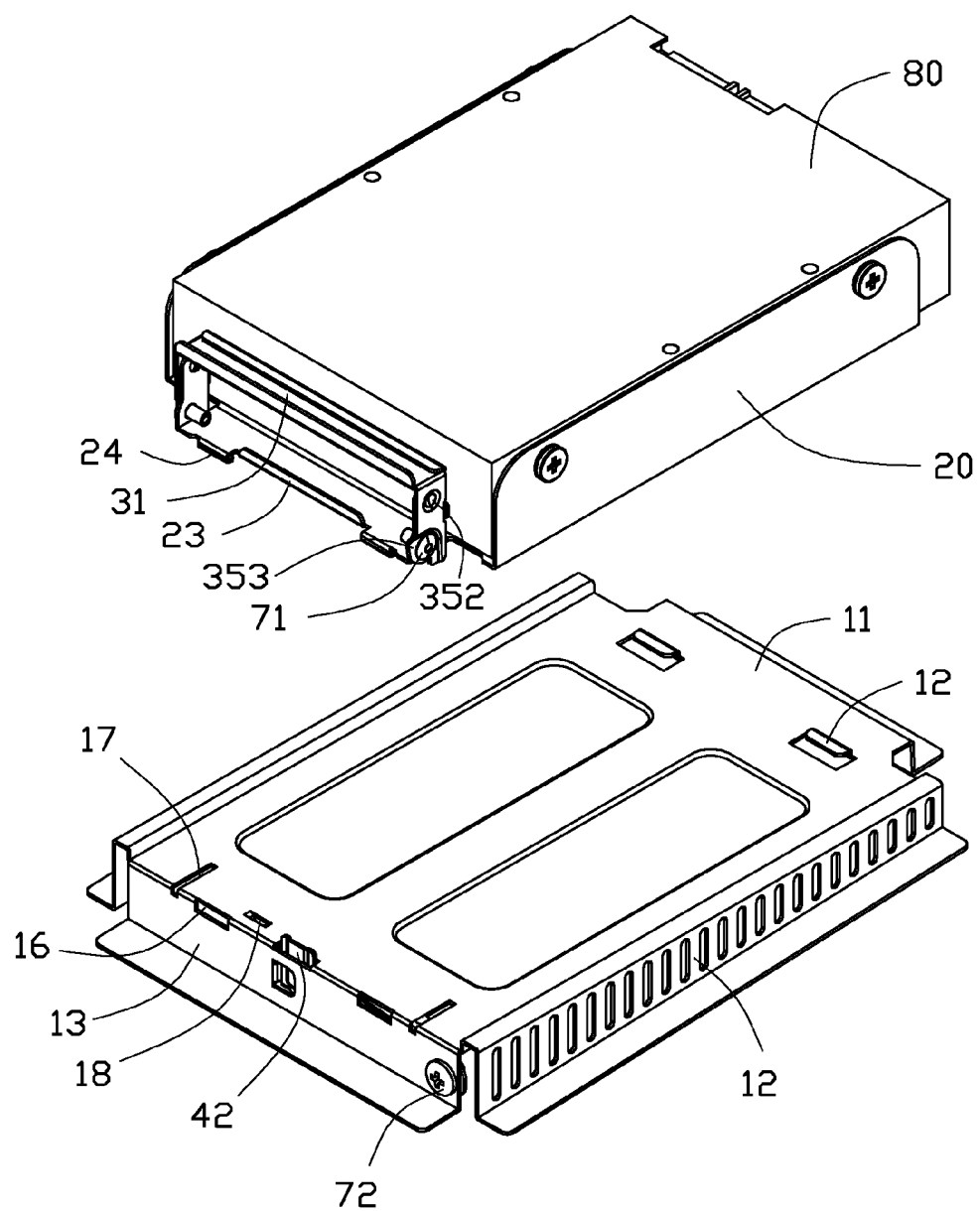
FIG. 4 is a partially assembled view of the extracting apparatus and the storage module of FIG. 1.

The bracket 10 is made of sheet metal, and is formed by punching. The bracket 10 includes a carrying plate 11, two side plates 12 respectively extending downward from opposite sides of the carrying plate 11, a fixing plate 13 extending downward from a front end of the carrying plate 11, and a bent plate 14 extending down from a rear end of the carrying plate 11. Each of the side plates 12 is bent upwards to form a shoulder (not labeled) to cooperate with the carrying plate 11 to receive the holder 20. Two substantially rectangular second openings 110 are defined in the carrying plate 11 corresponding to the first openings 210 of the holder 20. Two hooks 112 extend from the carrying plate 11 adjacent to the rear end of the carrying plate 11, for hooking onto a rear end of the bottom wall 21 of the holder 20. Also referring to FIG. 4, two slots 17 are defined in the front end of the carrying plate 11 for extension of the lower ends of the arms 35 and the cam 353 of the handle 30. Two clipping holes 16, between the slots 17, are defined in the front end of the carrying plate 11, for engaging with the insertion pieces 24 of the holder 20. A gap 15, between the clipping holes 16, is defined in a middle of the front end of the carrying plate 11, for a latch portion 42 (see below) of the locking member 40 to extend therethrough. A first ring 18, adjacent to the front end of the carrying plate 11, extends from a back surface of the carrying plate 11, for connecting to the elastic member 50. A guiding piece 19 is punched in the inner surface of the fixing plate 13 below to the gap 15 of the carrying plate 11 to limit lengthways movement of the latch portion 42.

The locking member 40 is an elongated piece. The locking member 40 includes a pivot portion 41 at a first end of the locking member 40 to be pivotably mounted to the bracket 10, and the latch portion 42 extending from a second end opposite to the first end of the locking member 40. A third pivot hole 410 is defined in the pivot portion 41, and a pivot 72 extends through the third pivot hole 410 and pivotably engages with the fixing plate 13; thus, the locking member 40 is rotatable relative to the fixing plate 13. The locking member 40 extends an L-shaped tongue 43 from a top edge thereof corresponding to one slot 17 of the carrying plate 11 of the bracket 10. The tongue 43 is located at a position between the latch portion 42 and the pivot portion 41. A second ring 44 extends from a back surface of the locking member 40.

The elastic member 50 is an extension spring in the present embodiment. The elastic member 50 elastically connects the first ring 18 of the carrying plate 11 to the second ring 44 of the locking member 40. In another embodiment, the elastic member 50 can be a torsion spring or a rubber band.

In assembly, the storage module 80 is fixed in the holder 20 with a number of screws 29, and the handle 30 is pivotably engaged with the handle mounts 25 of the holder 20 with the pins 71. The pivot portion 41 of the locking member 40 is pivotably engaged with an inner side of the fixing plate 13 with the pivot 72, and the second ring 44 of the locking member 40 is connected to the carrying plate 11 by the elastic member 50. The latch portion 42 is sandwiched between the fixing plate 13 and the guiding piece 19, and extends upwards through the gap 15 of the carrying plate 11 and beyond a top surface of carrying plate 11. The bracket 10 with the locking member 40 and the elastic member 50 is mounted in the electrical device.

In assembly of the storage module 80 with the holder 20 and the bracket 10, the rear end of the bottom wall 21 of the holder 20 is put onto the front end of the carrying plate 11 to press the latch portion 42 of the locking member 40 down. The locking member 40 is caused to rotate counter-clockwise around the pivot 72 and the elastic member 50 is stretched to generate an elastic force urging the locking member 40 upwards. The storage module 80 with the holder 20 is pushed along the shoulders of the side plates 12 from front to rear. When the whole holder 20 is guided onto the bracket 10, the rear end of the bottom wall 21 of the holder 20 is blocked by the hooks 112 of the carrying plate 11. The front end of the bottom wall 21 of the holder 20 passes the gap 15. With the pressure of the holder 20 gone, the latch portion 42 of the locking member 40 is extended upwards through the gap 15 by the elastic force of the elastic member 50 to firmly abut against the blocking portion 23 of the holder 20. The arms 35 of the handle 30 are perpendicular to the bottom wall 21 of the holder 20, and the protruding points 352 of the arms 35 are snapped into the snapping holes 252 of the corresponding handle mounts 25. At this moment, the holder 20 with the storage module 80 is located in the locked position. In the locked position, the cam 353 of the handle 30 is spaced from the tongue 43 of the locking member 40.

Figure 5:
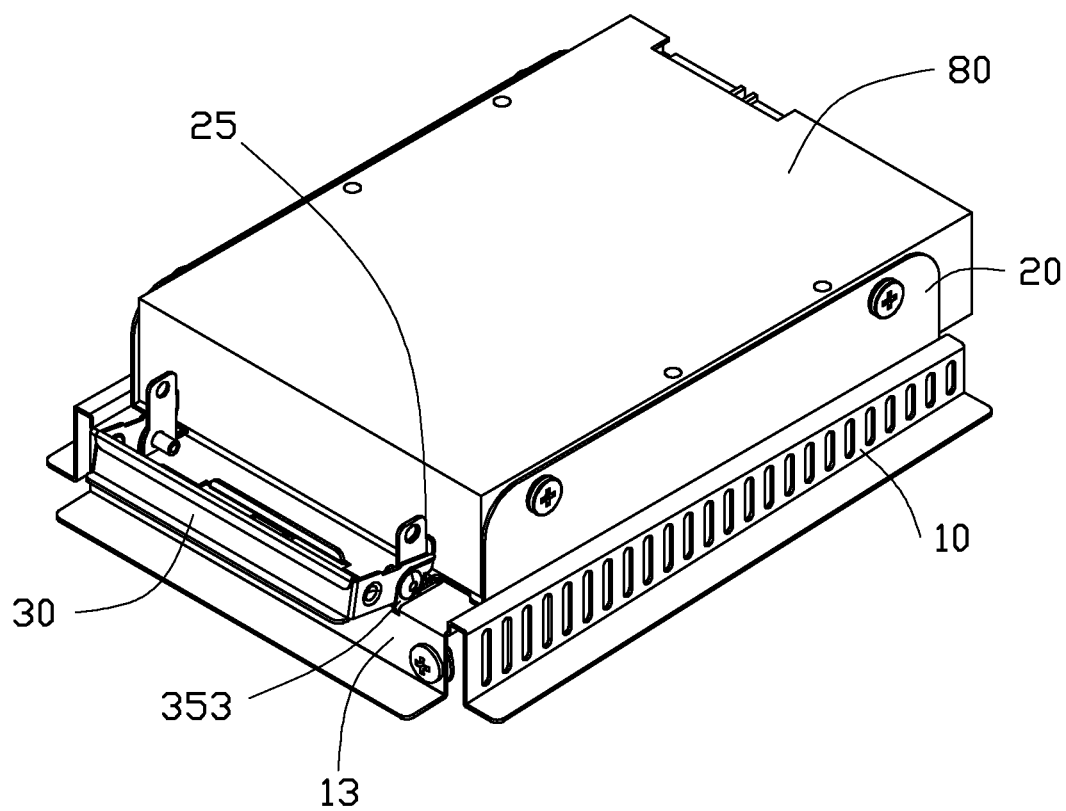
FIG. 5 is similar to FIG. 2, but in different stage.
Figure 6:
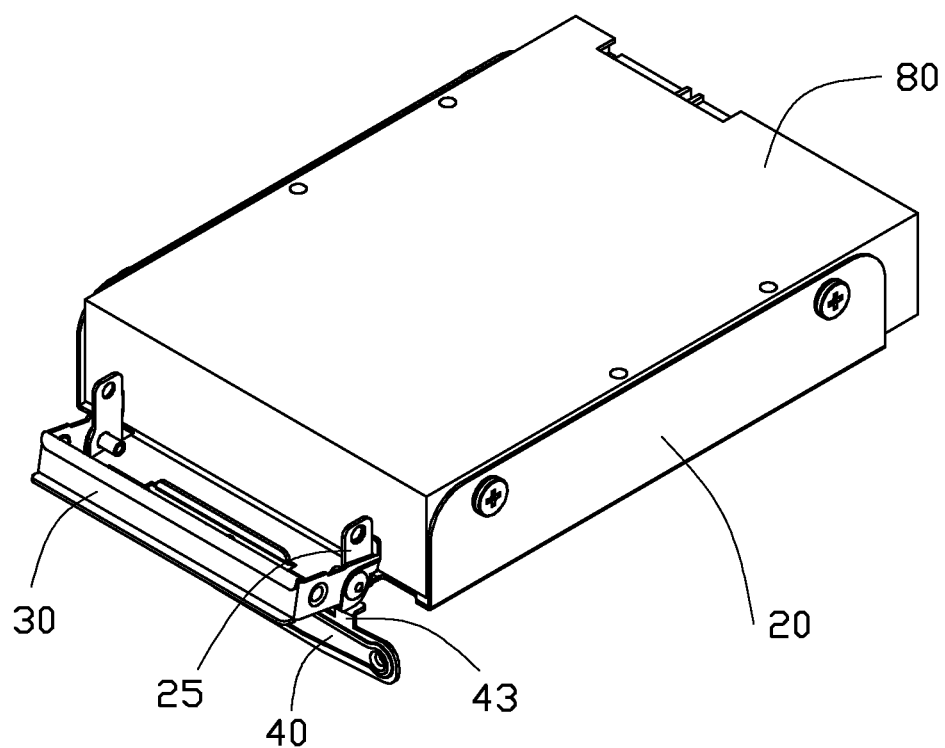
FIG. 6 is a partially cut-away view of FIG. 5.
Figure 7:
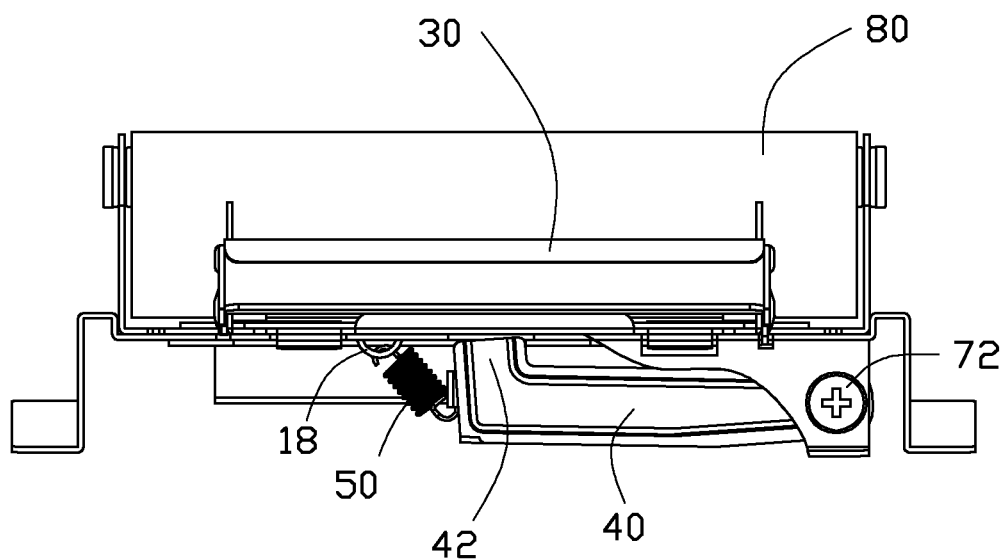
FIG. 7 is a front view of FIG. 5.

Referring to FIGS. 5-7, to detach the storage module 80 with the holder 20 from the bracket 10, the handle 30 is rotated to be parallel with the bottom wall 21 of the holder 20, during which time, the cam 353 of the handle 30 is rotated anti-clockwise. The cam 353 contacts the tongue 43 of the locking member 40 and presses the tongue 43 down to drive the locking member 40 to rotate around the pivot 72. The latch portion 42 of the locking member 40 withdraws from the gap 15 of the carrying plate 11; and then, the handle 30 is pulled from the bracket 10. As the holder 20 is slid away from the bracket 10, the holder 20 presses the latch portion 42 of the locking member 40. Therefore, the storage module 80 with the holder 20 readily disengages from the bracket 10.

As described above, when a user or operator exerts a relatively small force to rotate the handle 30, the storage module 80 with the holder 20 can be driven to slide from the bracket 10. Therefore, the extracting apparatus 100 is user-friendly.

It is to be understood, however, that even though numerous characteristics and advantages of various embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An extracting apparatus for a data storage module:
   a bracket;
   a holder detachably mounted to the bracket, the holder being for fixing the storage module;
   a locking member pivotably engaged with the bracket, the locking member comprising a latch portion;
   an elastic member connecting the bracket with the locking member; and
   a handle pivotably connecting to the holder, the handle comprising a cam;
   wherein when extracting apparatus is at a locked position, the latch portion of the locking member extends through the bracket to securely engage with the holder; and when the handle is pivoted to move toward the bracket, the cam of the handle drives the locking member to rotate relative to the bracket to release the holder from a locked position to a released position;
   wherein the locking member comprises a pivot portion pivotably engaged with the bracket, and a tongue between the pivot portion and the latch portion to abut against the cam of the handle; and
   wherein the bracket defines at least one slot for an extension of the cam of the handle.

2. The extracting apparatus of claim 1, wherein the bracket comprises at least one hook cooperating with the latch portion of the locking member to secure the holder.

3. The extracting apparatus of claim 1, wherein the bracket defines a gap for an extension of the latch portion of the locking member, and the bracket has a guiding piece below the gap to limit a lengthways movement of the latch portion.

4. The extracting apparatus of claim 1, wherein the bracket comprises a carrying plate and two side plates extending downward from opposite sides of the carrying plate, and each of the side plates is bent upwards to form a shoulder to receive the holder.

5. The extracting apparatus of claim 1, wherein the holder comprises a bottom wall and two handle mounts extending from an end of the bottom wall, the handle comprises an operating portion and two arms extending from opposite ends of the operating portion, and the arms are pivotably engaged with the handle mounts, respectively.

6. The extracting apparatus of claim 5, wherein the cam extends from one of the arms of the handle.

7. The extracting apparatus of claim 5, wherein each of the handle mounts of the handle defines a snapping hole, and each of the arms forms a protruding point towards the other arm to engage in the corresponding snapping hole.

8. The extracting apparatus of claim 5, wherein a length of the cam, which is perpendicular to the corresponding arm, is greater than a width of the cam, which is parallel to the corresponding arm.

9. An extracting apparatus for a data storage module:
   a bracket;
   a holder detachably mounted to the bracket, the holder being for fixing the storage module;
   a locking member pivotably engaged with the bracket, the locking member comprising a latch portion extending through the bracket to lock the holder at a locked position;
   an elastic member connecting the bracket with the locking member; and
   a handle pivotably connecting to the holder, the handle comprising a cam;

wherein when the handle is rotated from the locked position to a released position, the cam is rotated to press the latch portion of the locking member, thereby driving the locking member to rotate relative to the bracket to release the holder; and wherein the holder comprises a bottom wall and two handle mounts extending from an end of the bottom wall, the handle comprises an operating portion and two arms extending from opposite ends of the operating portion, and the arms are pivotably engaged with the handle mounts, respectively.

10. The extracting apparatus of claim 9, wherein the bracket comprises at least one hook cooperating with the latch portion of the locking member to secure the holder.

11. The extracting apparatus of claim 9, wherein the locking member comprises a pivot portion pivotably engaged with the bracket, and a tongue between the pivot portion and the latch portion to abut against the cam of the handle.

12. The extracting apparatus of claim 9, wherein the bracket defines a gap for an extension of the latch portion of the locking member, and the bracket comprises a guiding piece below the gap to limit a lengthways movement of the latch portion.

13. The extracting apparatus of claim 9, wherein each of the handle mounts of the handle defines a snapping hole, and each of the arms forms a protruding point towards the other arm to engage in the corresponding snapping hole.

14. The extracting apparatus of claim 9, wherein a length of the cam, which is perpendicular to the corresponding arm, is greater than a width of the cam, which is parallel to the corresponding arm.

15. An extracting apparatus for a data storage module:
a holder configured to hold the storage module;
a bracket detachedly positioned on a bottom surface of the holder and comprising a fixing plate and a plurality of hooks, the fixing plate extending downwards from an end of the bracket, and the hooks extending upwards from another end of the bracket opposite to the fixing plate;
a locking member comprising a pivot portion and a latch portion at two opposite ends thereof, the pivot portion rotatably connecting to the fixing plate and contacting an inner surface of the fixing plate, the latch portion extending through the bracket, the latch portion and the hooks contacting two opposite ends of the holder;
an elastic member connecting the bracket with the locking member; and
a handle pivotably connecting to the holder and adjacent to the locking member, the handle comprising a cam;
wherein the handle is capable of being rotated to make the cam pass through the bracket and push the locking member such that the latch portion moves away from the holder.

16. The extracting apparatus of claim 15, wherein the bracket defines a gap receiving the latch portion, and the bracket comprises a guiding piece below the gap to limit a lengthways movement of the latch portion.

17. The extracting apparatus of claim 15, wherein the holder comprises a bottom wall and two handle mounts extending from an end of the bottom wall, the handle comprises an operating portion and two arms extending from opposite ends of the operating portion, the arms are pivotably engaged with the handle mounts, and the cam extends from one of the arms.

* * * * *